US008548327B2

(12) United States Patent
Hirth et al.

(10) Patent No.: US 8,548,327 B2
(45) Date of Patent: Oct. 1, 2013

(54) DYNAMIC MANAGEMENT OF POLLING RATES IN AN ETHERNET PASSIVE OPTICAL NETWORK (EPON)

(75) Inventors: Ryan E. Hirth, Windsor, CA (US); Glen Kramer, Petaluma, CA (US)

(73) Assignee: Broadcom Corporation, Irvine, CA (US)

( * ) Notice: Subject to any disclaimer, the term of this patent is extended or adjusted under 35 U.S.C. 154(b) by 348 days.

(21) Appl. No.: 12/967,755

(22) Filed: Dec. 14, 2010

(65) Prior Publication Data

US 2011/0142442 A1 Jun. 16, 2011

Related U.S. Application Data

(60) Provisional application No. 61/286,679, filed on Dec. 15, 2009.

(51) Int. Cl.
*H04J 14/00* (2006.01)
*H04Q 11/00* (2006.01)

(52) U.S. Cl.
CPC ................................ *H04Q 11/0067* (2013.01)
USPC ............................................. 398/67; 398/72

(58) Field of Classification Search
USPC .................... 398/58, 66, 67, 71, 72
See application file for complete search history.

(56) References Cited

U.S. PATENT DOCUMENTS 7,653,084 B2 * 1/2010 Shin et al. ..................... 370/468
8,068,731 B2 * 11/2011 Peng et al. ...................... 398/58

* cited by examiner

*Primary Examiner* — Dalzid Singh
(74) *Attorney, Agent, or Firm* — Sterne, Kessler, Goldstein & Fox PLLC

(57) ABSTRACT

A system in an Optical Line Terminal (OLT) to dynamically manage polling rates in a passive optical network is provided herein. The system includes a Media Access Control (MAC) unit that is configured to receive a first message from an Optical Network Unit (ONU). The first message includes a status of an upstream queue of the ONU. The system includes a traffic monitor unit coupled to the MAC unit and is configured to receive the first message from the MAC unit and place the upstream queue of the ONU in an inactive mode if the status of the upstream queue indicates that the upstream queue is empty.

20 Claims, 6 Drawing Sheets

Figure 1:
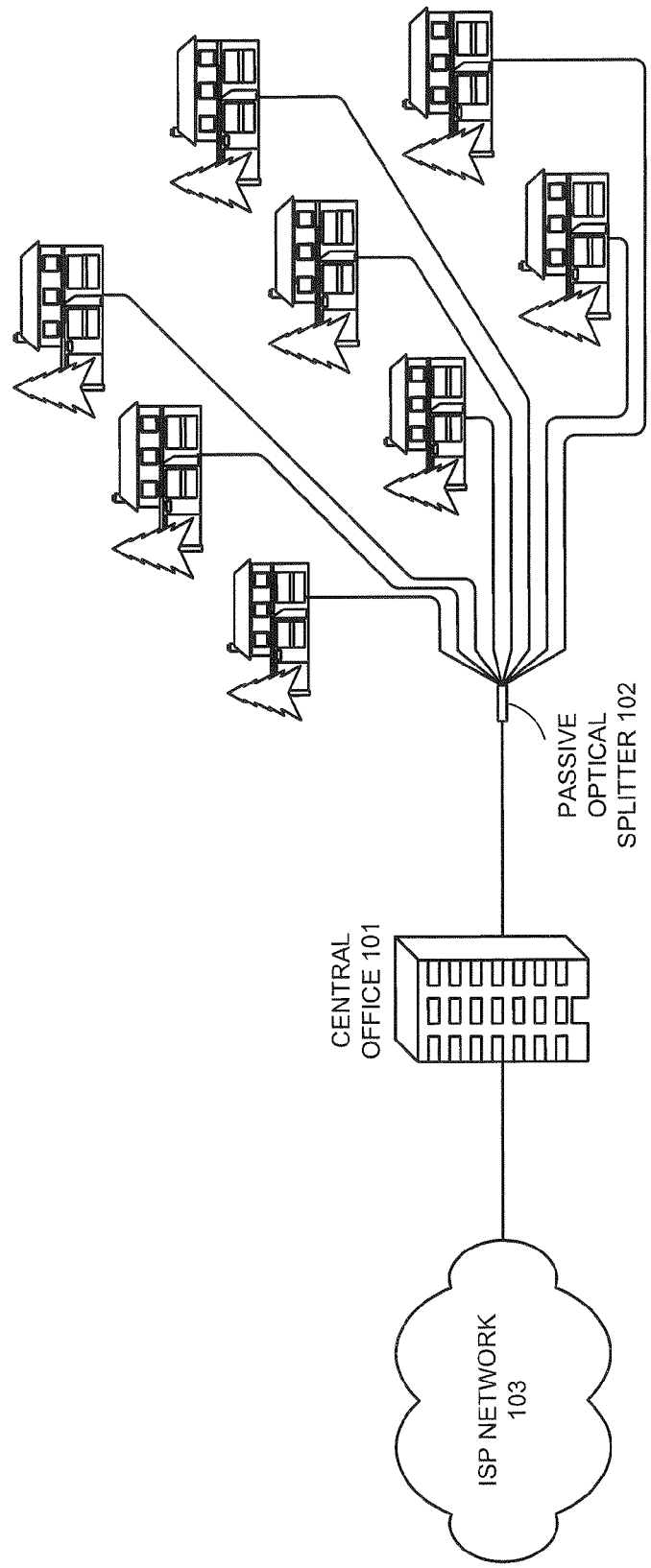

DYNAMIC MANAGEMENT OF POLLING RATES IN AN ETHERNET PASSIVE OPTICAL NETWORK (EPON)

CROSS REFERENCE TO RELATED APPLICATIONS

This application claims the benefit of U.S. Provisional Application No. 61/286,679 filed Dec. 15, 2009, which is incorporated herein by reference in its entirety.

BACKGROUND OF THE INVENTION

1. Field of the Invention

The present invention relates to an Ethernet Passive Optical Network (EPON). More specifically, the present invention relates to dynamic management of polling rates in an EPON.

2. Background Art

In conventional Ethernet Passive Optical Networks, an Optical Line Terminal (OLT) periodically polls multiple Optical Network Units (ONUs) to determine the amount of bandwidth that needs to allocated for each upstream queue in each ONU. However, some queues may not have any data to transmit resulting in unnecessary polling and wasted bandwidth by the OLT.

Methods and systems are needed to overcome the above mentioned deficiency.

BRIEF DESCRIPTION OF THE DRAWINGS/FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 1 presents a diagram illustrating an EPON wherein a central office and a number of customers are coupled through optical fibers and a passive optical splitter.

Figure 2:
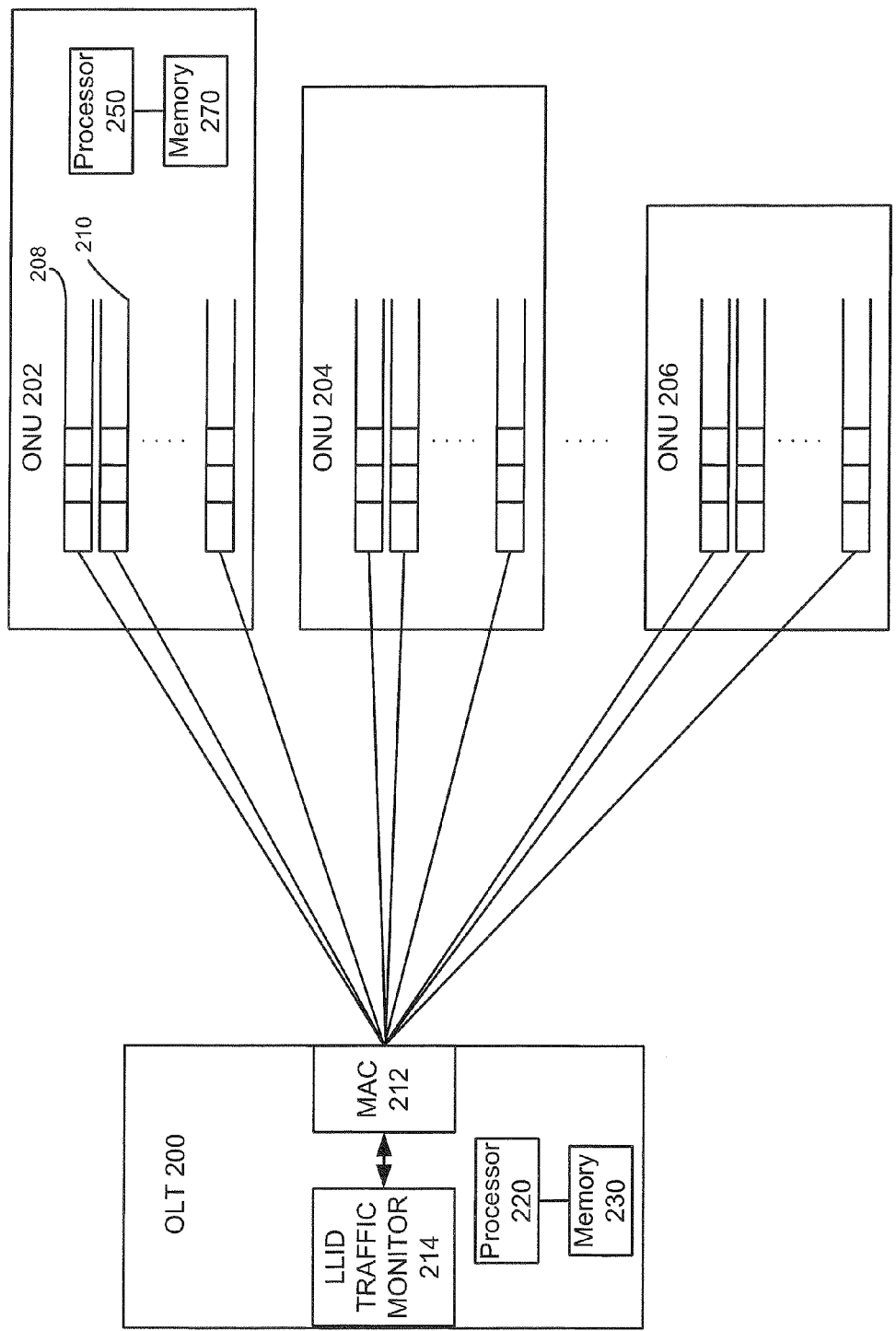

FIG. 2 presents a diagram illustrating an exemplary architecture of an EPON that implements multiple Logical Link Identifiers (LLIDs) for each ONU in accordance with an embodiment of the present invention.

Figure 3:
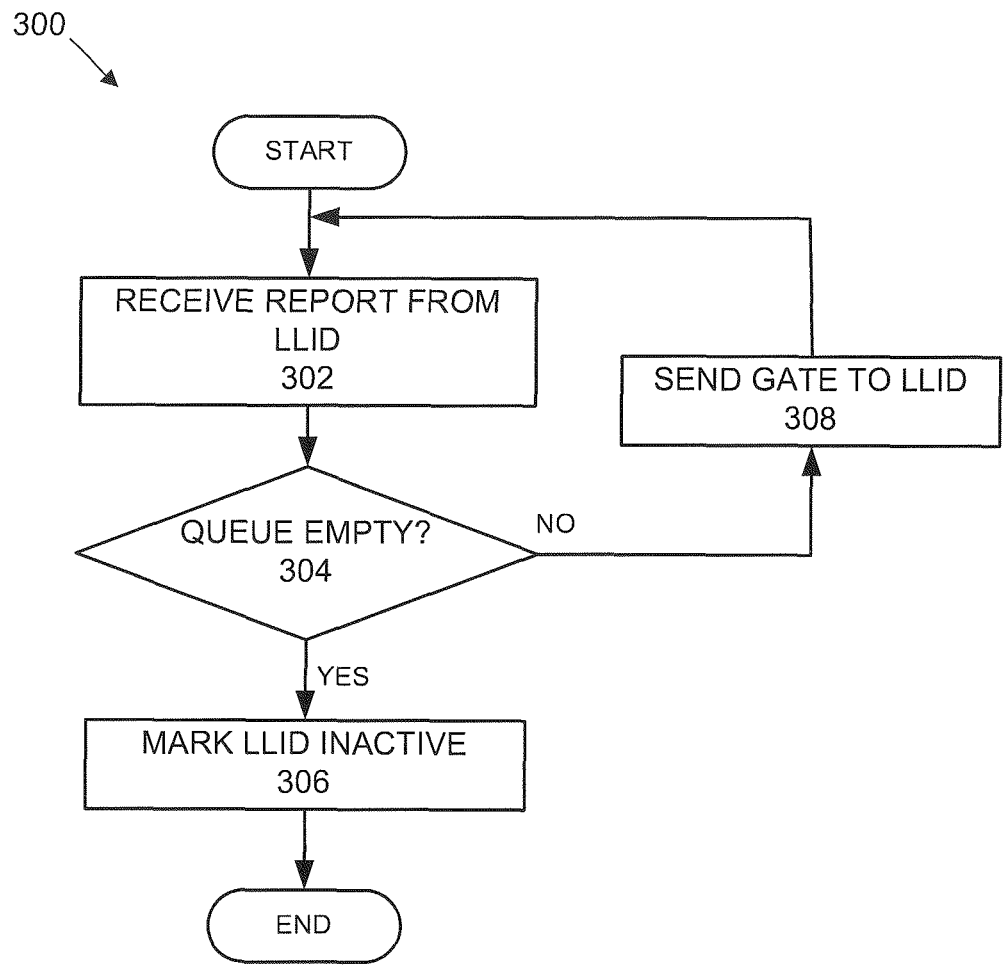

FIG. 3 presents a flow chart illustrating the process of placing an LLID in an inactive mode by an OLT in accordance with an embodiment of the present invention.

Figure 4:
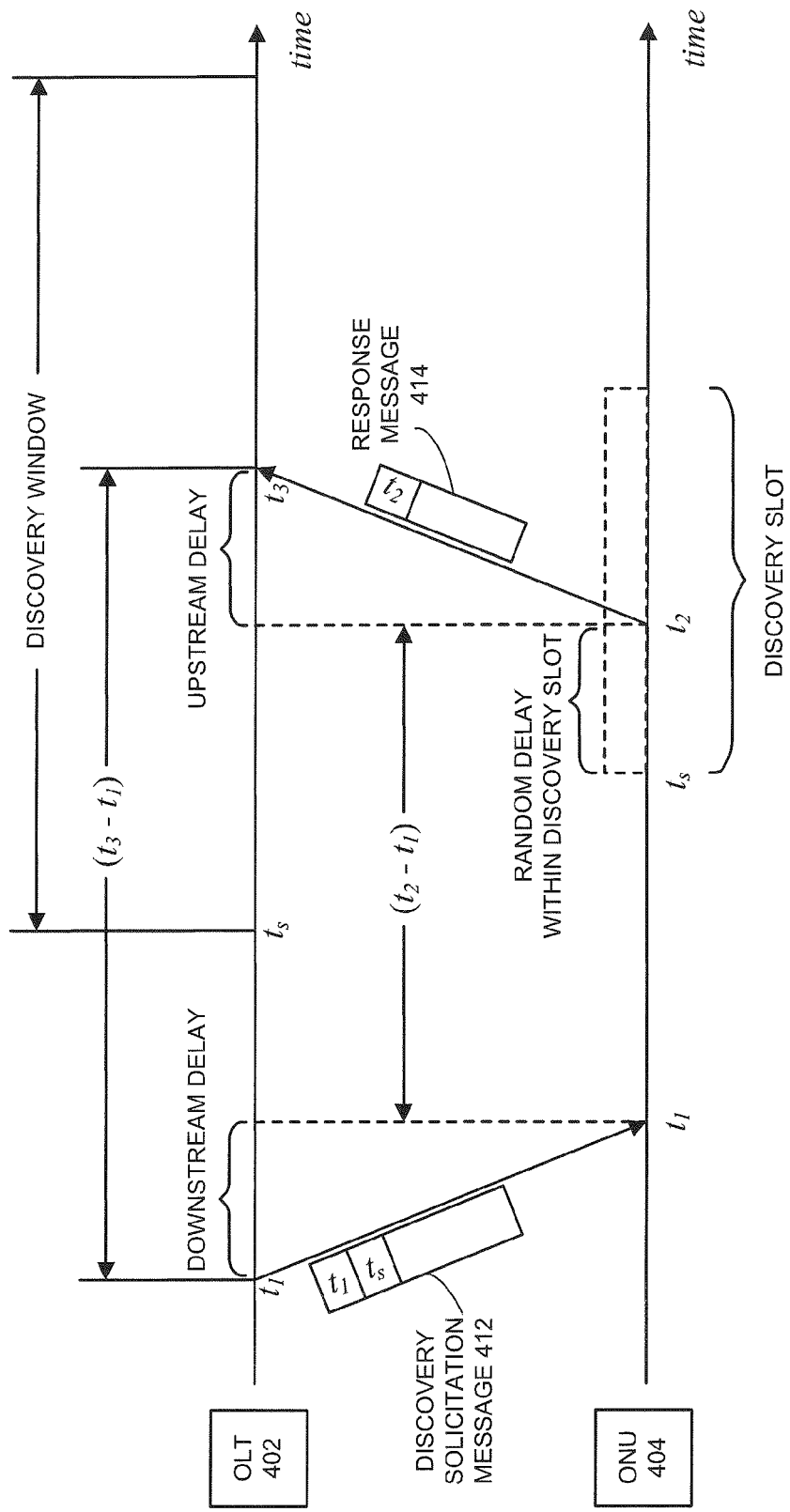

FIG. 4 presents a time-space diagram illustrating the discovery process (prior art).

Figure 5:
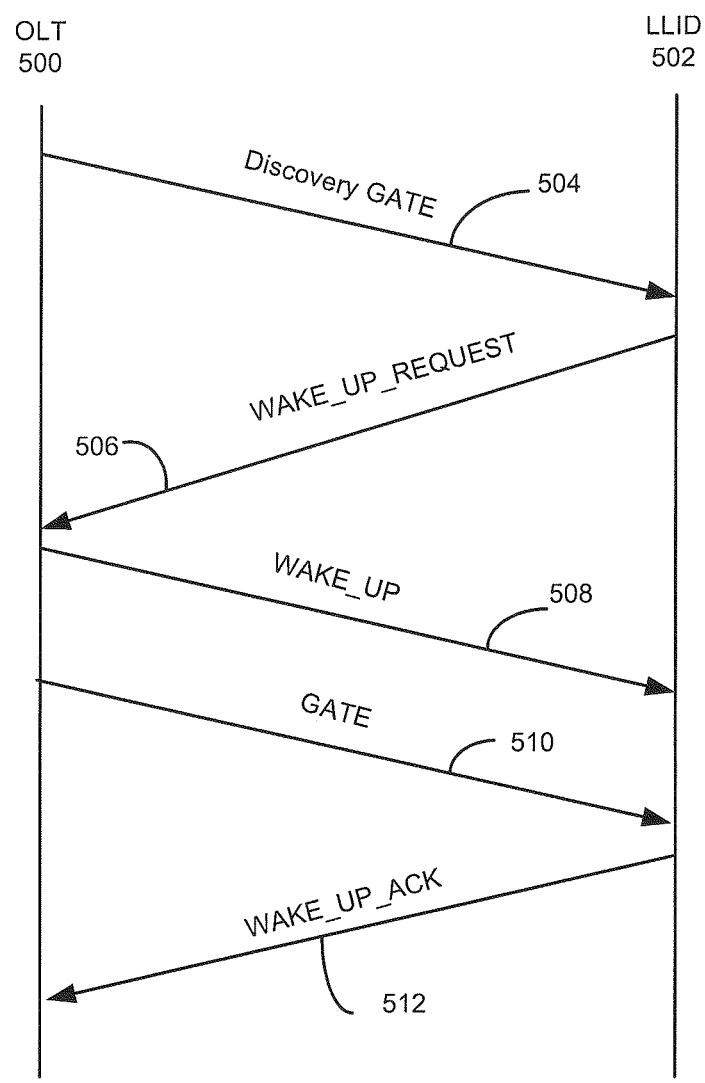

FIG. 5 presents a time-state diagram of a "wake-up" process of an LLID in accordance with an embodiment of the present invention.

Figure 6:
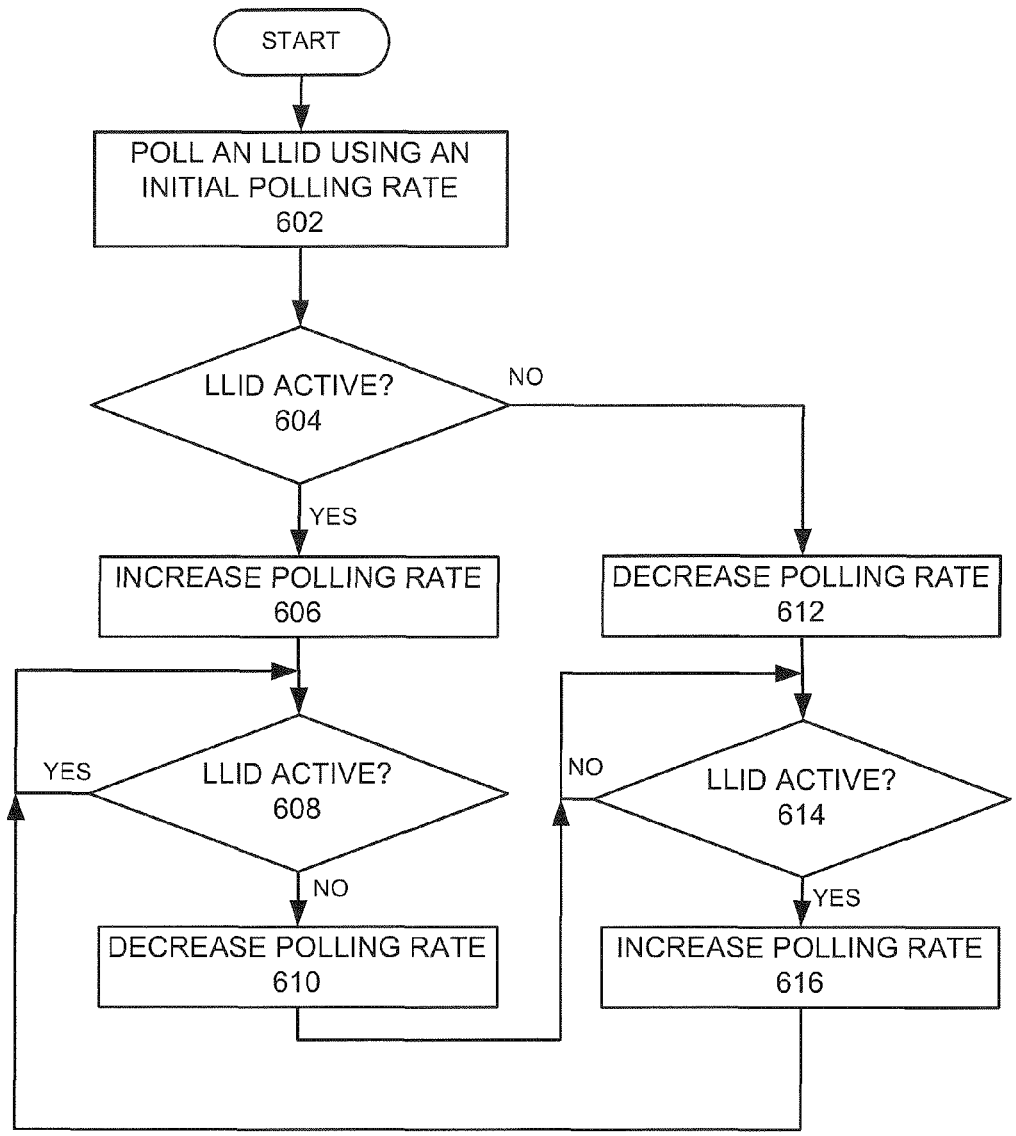

FIG. 6 presents a flow chart illustrating the process of dynamically adjusting the polling rate of an LLID based on its activity level or queue status.

The present invention will now be described with reference to the accompanying drawings. In the drawings, like reference numbers may indicate identical or functionally similar elements. Additionally, the left-most digit(s) of a reference number may identify the drawing in which the reference number first appears.

DETAILED DESCRIPTION OF THE INVENTION

Embodiments presented herein, or portions thereof, can be implemented in hardware, firmware, software, and/or combinations thereof. The embodiments presented herein apply to any communication system that uses burst and/or continuous mode transmission.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention (e.g., general passive optical network (PON) architectures). Thus, the present invention is not intended to be limited to the embodiments shown, but is to be accorded the widest scope consistent with the principles and features disclosed herein.

Overview

In order to keep pace with increasing Internet traffic, network operators have widely deployed optical fibers and optical transmission equipment, substantially increasing the capacity of backbone networks. A corresponding increase in access network capacity is also needed to meet the increasing bandwidth demand of end users. Even with current broadband solutions, such as digital subscriber line (DSL) and cable modem (CM), the limited bandwidth of the access networks still presents a severe bottleneck in delivering large bandwidth to end users.

Among different competing technologies, EPONs or passive optical networks (PONs) are one of the best candidates for next-generation access networks. With the large bandwidth of optical fibers, PONs can accommodate broadband voice, data, and video traffic simultaneously. Such integrated service is difficult to provide with DSL or CM technology. Furthermore, PONs can be built with existing protocols, such as Ethernet and ATM, which facilitate interoperability between PONs and other network equipment.

Typically, PONs are used in the "first mile" of the network, which provides connectivity between the service provider's central offices and the premises of the customers. The "first mile" is generally a logical point-to-multipoint network, where a central office serves a number of customers. For example, a PON can adopt a tree topology, wherein one trunk fiber couples the central office to a passive optical splitter/combiner. Through a number of branch fibers, the passive optical splitter/combiner divides and distributes downstream optical signals to customers and combines upstream optical signals from customers (see FIG. 1). Note that other topologies, such as ring and mesh topologies, are also possible.

Transmissions within a PON are typically performed between an optical line terminal (OLT) and optical network units (ONUs). The OLT generally resides in the central office and couples the optical access network to a metro backbone, which can be an external network belonging to, for example, an Internet service provider (ISP) or a local exchange carrier. The ONU can reside in the residence of the customer and couples to the customer's own home network through a customer-premises equipment (CPE).

FIG. 1 illustrates a passive optical network including a central office and a number of customers coupled through optical fibers and a passive optical splitter (prior art). A passive optical splitter 102 and optical fibers couple the customers to a central office 101.

Passive optical splitter 102 can reside near end-user locations to minimize the initial fiber deployment costs. Central office 101 can couple to an external network 103, such as a metropolitan area network operated by an Internet service provider (ISP). Although FIG. 1 illustrates a tree topology, a PON can also be based on other topologies, such as a logical ring or a logical bus. Note that, although in this disclosure many examples are based on EPONs, embodiments of the present invention are not limited to EPONs and can be applied to a variety of PONs, such as ATM PONs (APONs) and wavelength division multiplexing (WDM) PONs.

In an EPON, communications can include downstream traffic and upstream traffic. In the following description, "downstream" refers to the direction from an OLT to one or more ONUs, and "upstream" refers to the direction from an ONU to the OLT. In the downstream direction, because of the broadcast nature of the 1×N passive optical coupler, data packets are broadcast by the OLT to all ONUs and are selectively extracted by their destination ONUs. Moreover, each ONU is assigned one or more Logical Link Identifiers (LLIDs), and a data packet transmitted by the OLT typically specifies an LLID of the destination ONU. In the upstream direction, the ONUs need to share channel capacity and resources, because there is only one link coupling the passive optical coupler to the OLT.

In order to avoid collision of upstream transmissions from different ONUs, ONU transmissions are arbitrated. This arbitration can be achieved by allocating a transmission window (grant) to each ONU. An ONU defers transmission until its grant arrives. A Multi Point Control Protocol (MPCP) located in the MAC control layer can be used to assign transmission time slots to ONUs. MPCP relies on GATE message (a message from the OLT to the ONU to assign grant) and a REPORT message (a message from the ONU to the OLT reporting its upstream queue status). In an example, messages conforming to the IEEE 802.3ah Operations, Administration and Maintenance (OAM) protocol may be used in the embodiments described herein. The queue status may include, for example, the depth of the upstream queue. While the REPORT message carries information about individual queues in the ONU, the GATE message only assigns one aggregated slot to the ONU. In effect, this delegates the task of scheduling various queues within the slot to the ONUs, requiring ONUs to be aware of the service level agreement (SLA) and to be able to perform traffic-shaping functions. This approach results in a highly complex, non-robust, and inefficient solution. An alternative approach that assigns a separate logical link, thus LLID, for each queue allows full EPON intelligence to be concentrated at the OLT, thus improving EPON's efficiency, flexibility, interoperability, and cost-effectiveness. In embodiments presented herein, "LLID" and its associated "upstream queue" may be used interchangeably.

However, the increased number of LLIDs within an ONU increases the bandwidth consumed by LLID status polling, because the OLT periodically polls each LLID for its current queuing status, thus increasing scheduling bandwidth overhead. In addition, in a multi-dwelling unit (MDU) environment, due to the large number of ONU and/or LLIDs, the periodic polling of their queue status can also increase the bandwidth overhead.

In embodiments of the present invention, based on link traffic status, an OLT can instruct one or more LLIDs located on a downstream ONU to enter an inactive state. The OLT does not poll LLIDs (and receive REPORT messages from LLIDs) that are inactive, thus reducing scheduling overhead. An inactive LLID can be "awakened" by the OLT during a discovery process.

Dynamic Management of Polling

FIG. 2 presents a diagram illustrating an exemplary architecture of an EPON that implements multiple LLIDs for each ONU in accordance with an embodiment of the present invention. An EPON includes an OLT 200 and a number of ONUs, such as ONUs 202-206. Each ONU includes a number of queues, each of which is assigned an LLID. For example, ONU 202 includes a number of queues, and each queue is assigned a LLID, such as LLID 208 and LLID 210. Each ONU may also include a processor coupled to a memory. For example, ONU 202 may include a processor 250 coupled to a memory 270. OLT 200 includes a Media Access Control (MAC) module 212, which may implement MPCP, and a traffic monitor 214 (also referred to as a LLID traffic monitor 214 herein) coupled to MAC 212. OLT 200 also includes a processor 220 coupled to a memory 230.

In order to schedule upstream transmissions, OLT 200 interchanges GATE and REPORT messages with respect to each LLID. In other words, a separate REPORT message is sent to OLT 200 for each LLID, and OLT 200 grants each LLID separately by sending a GATE messages to the ONU hosting the LLID. Assigning multiple LLIDs to each ONU provides many benefits, such as allowing different applications, such as videos and voice, on an ONU to have independent SLAs. However, polling each individual LLID occupies bandwidth. Consequently, as the number of LLIDs per ONU increases, the bandwidth overhead also increases.

To reduce bandwidth overhead, instead of polling all LLIDs, OLT 200 can place one or more LLIDs in an inactive mode and skip the polling of the inactive LLIDs. In other words, once in inactive mode, the LLID stops sending REPORT messages to the OLT. In one embodiment, the OLT places an LLID in an inactive mode based on the link traffic of the LLID. During operation, LLID traffic monitor 214 monitors traffic on each individual LLID. In one embodiment, LLID traffic monitor 214 monitors upstream traffic from each LLID based on a previous REPORT message sent by the LLID. For example, LLID 208 sends a REPORT message to MAC 212, which in turn forwards the REPORT message to LLID traffic monitor 214. LLID traffic monitor 214 extracts queuing information from the REPORT message. If the REPORT message indicates an empty queue for LLID 208, LLID traffic monitor 214 then places LLID 208 in an inactive mode by instructing MAC 212 to stop polling LLID 208, thus preventing LLID 208 from sending a REPORT message. The LLID 208 stops sending REPORT messages because LLID 208 can send report message only upon receiving a GATE message or DISCOVERY GATE messages from MAC 212. In another example, traffic monitor 214 places an LLID 208 in an inactive mode by transmitting a message to LLID 208 to stop sending REPORT messages to MAC 212 unless the LLID 208 has data to transmit in its upstream queue. In the embodiments presented herein, the functions described as being performed by LLIDs may be performed by, for example, processor 250 based on instructions stored in memory 270 of ONU 202. Also, in the embodiments presented herein, the functions described as being performed by MAC 212 or traffic monitor 214 may be performed by processor 220 based on instructions stored in memory 230.

FIG. 3 illustrates an example flowchart 300 illustrating steps performed to place an LLID in an inactive mode by an OLT in accordance with an embodiment of the present invention. Flowchart 300 will be described with continued reference to the example operating environment depicted in FIGS. 1-2. However, the flowchart is not limited to these embodiments. Note that some steps shown in flowchart 300 do not necessarily have to occur in the order shown. The steps in flowchart 300 may be performed, in part or in whole by, for example, traffic manager 214 and/or processor 220 based on instructions stored in memory 230.

During operation, the OLT receives a REPORT message from an LLID (operation 302). For example, Based on the queue report included in the REPORT message, the OLT determines whether the LLID has an empty queue (operation 304). If so, the OLT marks the LLID inactive, or places the LLID in an inactive mode (operation 306). If not, the OLT sends a GATE message to the LLID (operation 308) and receives a subsequent REPORT message (operation 302).

As long as an LLID is marked as inactive by traffic manager 214, no GATE messages are sent by MAC 212 to the inactive LLID and hence no corresponding REPORT message is generated from the inactive LLID, thus reducing polling bandwidth overhead of the OLT. When the inactive LLID's queue is no longer empty, the LLID needs to be active again. To do so, the LLID can request upstream transmission bandwidth. In one embodiment, the LLID "wakes up" (changes from inactive mode to active mode) during a discovery process. Discovery is a mode of operation specified by MPCP, during which OLT discovers and initializes any newly joined ONUs. An OLT is configured to periodically reserve time periods for discovery.

FIG. 4 presents a time-space diagram illustrating the discovery process (prior art). At the beginning of the discovery process, OLT 402 first sets a start time $t_s$ of a time interval in which OLT 402 enters the discovery mode and allows new ONUs to register (this time interval is called the discovery window). Note that, from the current time until $t_s$, OLT 402 can keep receiving normal upstream data from registered ONUs. OLT 402 also sets a time interval during which each newly joined ONU is allowed to transmit a response message to OLT 402 to request registration (called the discovery slot), wherein the start time of a discovery slot is the same as the start time of the discovery window, $t_s$. Since there might be more than one ONU seeking registration, and since the distance between an unregistered ONU and OLT 402 is unknown, the size of the discovery window should at least include the size of a discovery slot and the maximum allowed round-trip delay between an ONU and OLT 402.

At a time $t_1$ ($t_1 < t_s$), OLT 402 broadcasts a discovery solicitation message 412 (which can be a DISCOVERY_GATE message, in accordance with the IEEE standard 802.3ah) to all ONUs, including a newly joined unregistered ONU 404. Discovery solicitation message 412 includes a timestamp of $t_h$ which is the time when the message is sent by OLT 402, and a timestamp of $t_s$, which is the start time of the discovery slot. Upon receiving discovery solicitation message 412, ONU 404 sets its local clock to $t_1$ according to the timestamp carried by discovery solicitation message 412.

When ONU 404's local clock reaches $t_s$, the start time of the discovery slot, ONU 404 waits an additional random delay and then transmits a response message 414 (which can be a REGISTER_REQUEST message, in accordance with the IEEE standard 802.3ah). This random delay is applied to avoid persistent collisions when response messages from multiple uninitialized ONUs consistently collide. Response message 414 contains ONU 404's MAC address and a timestamp of $t_2$, which is ONU 404's local time when response message 414 is sent.

When OLT 402 receives response message 414 from ONU 404 at time $t_3$, it learns ONU 404's MAC address and ONU 404's local time $t_2$ when response message 414 is sent. OLT 402 can then compute the round-trip delay of ONU 404, which is $[(t_3-t_1)-(t_2-t_1)]=(t_2-t_3)$.

In one embodiment of the present invention, an LLID recovered from an inactive mode can respond to discovery solicitation message 412 by sending a "WAKE_UP_REQUEST" message requesting to be woken up. The "WAKE_UP_REQUEST" message from the LLID includes the LLID's MAC address.

FIG. 5 presents a time-state diagram of a "wake-up" process of an LLID in accordance with an embodiment of the present invention. During operation, OLT 500 broadcasts a "Discovery Gate" to all ONUs (operation 504). LLID 502 responds to the "Discovery Gate" with a "WAKE_UP_REQUEST" message indicating its intention to wake up and its MAC address (operation 506). OLT 500 responds to the "WAKE_UP_REQUEST" message with a "WAKE_UP" message (operation 508) and a following GATE message (operation 510). Subsequently, LLID 502 sends a WAKE_UP_ACK message to respond to the "WAKE_UP" message indicating LLID 502 is now awake (operation 512). In an example, the WAKE_UP_REQUEST message may also include a status of the upstream queue for the LLID and the WAKE_UP message may include bandwidth allocation to the LLID 502 based on the status of the upstream queue. Once awake, LLID 502 resumes sending REPORT messages to OLT 500 periodically. It is to be appreciated that WAKE_UP, WAKE_UP_REQUEST and WAKE_UP_ACK messages are not currently part of the MPCP or OAM protocol.

In one embodiment, the wake-up process of an inactive LLID involves another active LLID. Because there might be active LLIDs existing on the same ONU, which are sending periodic REPORT messages to the OLT, an inactive LLID can piggyback its request to be awakened to the REPORT message of an active LLID. For example, the REPORT message of an adjacent LLID may be altered to include the MAC address of an inactive LLID and its queue report. Once the OLT receives the altered REPORT message, the OLT can extract the MAC address of the inactive LLID and wake up the inactive LLID by sending a GATE message to grant the LLID upstream transmission bandwidth. In the scenario that all LLIDs on an ONU are inactive, the LLIDs can be woken up during the discovery process.

In one embodiment, the system is configured to dynamically adjust the polling rate of LLIDs and/or ONUs based on their activity level. During operation, the system first polls all LLIDs using a predetermined polling rate. The activity level of an upstream queue or LLID may be based on a queue depth of the upstream queue. For example an LLID may be referred to as "active" if its queue depth is greater than a certain threshold. An LLID may be referred to as "inactive" if its queue depth is below the threshold. Based on the polling result, the system identifies LLIDs and/or ONUs that are active, and increase the polling rate for these active LLID and/or ONUs. In addition, the system identifies LLIDs and/or ONUs that are inactive, and decrease the polling rate for them.

FIG. 6 presents a flow chart illustrating the process of dynamically adjusting the polling rate of an LLID based on its activity level or queue status. During operation, the system polls the LLID using an initial polling rate (operation 602). Based on the polling result, the system determines whether the LLID is active (operation 604). If so, the system increases its polling rate (operation 606). If not, the system decreases its polling rate (operation 612). The system continues to poll the active LLID using the increased polling rate until the system determines that the LLID is no longer active (operation 608), and decreases its polling rate (operation 610). On the other hand, the system continues to poll the inactive LLID with decreased polling rate until the system determines that the LLID becomes active (operation 614), and in response, the system increases its polling rate (operation 616).

The foregoing descriptions of embodiments of the present invention have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

The representative functions described herein (e.g. functions performed by LLID traffic monitor 214) can be implemented in hardware, software, or some combination thereof. For instance, these functions can be implemented using computer processors, such as a processor 220, processor 250, computer logic, application specific circuits (ASIC), digital signal processors, etc., or any combination thereof, as will be understood by those skilled in the arts based on the discussion given herein. Accordingly, any processor that performs the functions described herein is within the scope and spirit of the embodiments presented herein.

Further, the processing functions described herein could be embodied by computer program instructions that are executed by a computer processor. The computer program instructions cause the processor to perform the instructions described herein. The computer program instructions (e.g. software) can be stored in a computer usable medium, computer program medium, or any storage medium such as memory 270 or memory 230 that can be accessed by a computer or processor such as processor 250 or processor 220. Such media include a memory device, a RAM or ROM, or other type of computer storage medium such as a computer disk or CD ROM, or the equivalent. Accordingly, any computer storage medium having computer program code that cause a processor to perform the functions described herein are within the scope and spirit of the embodiments presented herein.

CONCLUSION

While various embodiments have been described above, it should be understood that they have been presented by way of example, and not limitation. It will be apparent to persons skilled in the relevant art that various changes in form and detail can be made therein without departing from the spirit and scope of the embodiments presented herein.

The embodiments presented herein have been described above with the aid of functional building blocks and method steps illustrating the performance of specified functions and relationships thereof. The boundaries of these functional building blocks and method steps have been arbitrarily defined herein for the convenience of the description. Alternate boundaries can be defined so long as the specified functions and relationships thereof are appropriately performed. Any such alternate boundaries are thus within the scope and spirit of the claimed embodiments. One skilled in the art will recognize that these functional building blocks can be implemented by discrete components, application specific integrated circuits, processors executing appropriate software and the like or any combination thereof. Thus, the breadth and scope of the present embodiments should not be limited by any of the above-described exemplary embodiments, but should be defined only in accordance with the following claims and their equivalents.

It is to be appreciated that the Detailed Description section, and not the Abstract section, is intended to be used to interpret the claims. The Abstract section may set forth one or more but not all exemplary embodiments of the present invention as contemplated by the inventor(s), and thus, are not intended to limit the present invention and the appended claims in any way.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A system in an Optical Line Terminal (OLT) to dynamically manage polling rates in a passive optical network, comprising:
    a Media Access Control (MAC) unit configured to receive a first message from an Optical Network Unit (ONU), wherein the first message includes a status of an upstream queue of the ONU; and
    a traffic monitor unit coupled to the MAC unit and configured to receive the first message from the MAC unit and place the upstream queue of the ONU in an inactive mode if the status of the upstream queue indicates that the upstream queue is empty.

2. The system of claim 1, wherein the first message is a REPORT message of the Multi-Point Control Protocol (MPCP) or Operations, Administration and Management (OAM) protocol.

3. The system of claim 1, wherein the MAC unit is configured to suspend polling of the upstream queue if the upstream queue is placed in an inactive mode.

4. The system of claim 1, wherein the MAC unit is configured to suspend sending of a GATE message corresponding to a logical link identifier (LLID) associated with an inactive upstream queue until a wake up request message is received from the ONU that the upstream queue has data for transmission.

5. The system of claim 1, wherein the traffic monitor unit is further configured to command the MAC unit to re-start polling the upstream queue upon receiving a second message from the ONU that indicates that the upstream queue has data for transmission.

6. The system of claim 5, wherein the second message is received during a discovery process of the Multi-Point Control Protocol (MPCP).

7. The system of claim 5, wherein the second message is a piggyback message requesting the traffic monitor to actively poll the upstream queue, wherein the piggyback message is sent in conjunction with a REPORT message for another upstream queue.

8. A method to manage upstream queues in an Optical Network Unit (ONU) of a passive optical network, comprising:
    transmitting a first message to an Optical Line Terminal (OLT) indicating a status of an upstream queue;
    receiving a second message, that grants upstream bandwidth, from the OLT if the upstream queue has data for transmission; and
    suspending, using a processor, transmission of further messages, that correspond to the upstream queue, to the OLT if a second message granting upstream bandwidth is not received from the OLT and if the status of the queue indicates that the queue is empty.

9. The method of claim 8, wherein the first message is a REPORT message and the second message is a GATE message of the Multi-Point Control Protocol (MPCP).

10. The method of claim 8, further comprising:
receiving a discovery message from the OLT;
transmitting a wake_up_request message to the OLT corresponding to the upstream queue if the upstream queue has data for transmission, wherein the wake_up_request message includes a Media Access Control (MAC) address of a logical link identifier (LLID) associated with the queue and a status of the queue that indicates the queue depth; and
receiving a wake_up message from the OLT, wherein the wake_up message allocates bandwidth to the ONU based on the status of the queue in the wake_up_request message.

11. The method of claim 8, further comprising:
piggybacking a wake_up_request message with a REPORT message of another upstream queue to the OLT, wherein the wake_up_request message includes a logical link identifier (LLID) associated with the upstream queue and a status of the upstream queue that indicates the queue depth; and
receiving a wake_up message from the OLT, wherein the wake_up message allocates bandwidth based on the status of the queue in the wake_up_request message.

12. An Optical Network Unit (ONU) configured to manage upstream queues, comprising:
a memory; and
a processor coupled to the memory, wherein the processor is configured to, based on instructions stored in the memory:
transmit a first message to an Optical Line Terminal (OLT) to indicate a status of an upstream queue;
receive a second message, that grants upstream bandwidth, from the OLT if the upstream queue has data for transmission; and
suspend transmission of further messages, that correspond to the upstream queue, to the OLT if a second message granting upstream bandwidth is not received from the OLT and if the status of the queue indicates that the queue is empty.

13. A method to manage polling of upstream queues in an Optical Network Unit (ONU) of a passive optical network, comprising:
transmitting a first message to an Optical Line Terminal (OLT) indicating the status of an upstream queue;
receiving the first message by a Media Access Control (MAC) unit of the OLT;
determining whether the upstream queue has data for transmission based on the status of the upstream queue;
transmitting a second message to the ONU allocating bandwidth for upstream transmission if the status of the upstream queue indicates that the upstream queue has data for transmission; and
placing the upstream queue in an inactive mode if the status of the upstream queue indicates that the upstream queue does not have data for transmission;
wherein the OLT does not poll the upstream queue in the inactive mode until the upstream queue indicates that it has data for transmission.

14. The method of claim 13, wherein the first message is a REPORT message of the Multi-Point Control Protocol (MPCP) or Operations, Administration and Management (OAM) protocol.

15. The method of claim 13, further comprising suspending polling of the upstream queue if the upstream queue is placed in an inactive mode.

16. The method of claim 13, further comprising suspending sending of a GATE message corresponding to a logical link identifier (LLID) associated with an inactive upstream queue until a wake up request message is received from the ONU that the upstream queue has data for transmission.

17. The method of claim 13, further comprising re-starting polling of the upstream queue upon receiving a second message from the ONU that indicates that the upstream queue has data for transmission.

18. The method of claim 17, further comprising receiving the second message during a discovery process of the Multi-Point Control Protocol (MPCP).

19. The method of claim 17, wherein the second message is a piggyback message requesting the traffic monitor to actively poll the upstream queue, wherein the piggyback message is sent to the OLT in conjunction with a REPORT message for another upstream queue.

20. A method to dynamically manage polling rates in a passive optical network, comprising:
polling, using a processor, a queue in an Optical Network Unit (ONU) at an initial polling rate;
determining whether the queue has data for transmission;
decreasing the initial polling rate to a decreased polling rate if the queue does not have data for transmission;
polling the queue at the decreased polling rate until the queue has data for transmission; and
increasing the decreased polling rate upon determining that the queue has data for transmission.

* * * * *